United States Patent
Beuschel et al.

(10) Patent No.: US 12,359,655 B2
(45) Date of Patent: Jul. 15, 2025

(54) METHOD FOR DETECTING THE POSITION OF AN ACTUATOR ELEMENT

(71) Applicant: Conti Temic microelectronic GmbH, Ingolstadt (DE)

(72) Inventors: Michael Beuschel, Stammham (DE); Stefan Bauer, Engelbrechtsmünster (DE); Rainer Schmidt, Reichertshofen (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 0 days.

(21) Appl. No.: 18/694,623

(22) PCT Filed: Sep. 1, 2022

(86) PCT No.: PCT/DE2022/200200
§ 371 (c)(1),
(2) Date: Mar. 22, 2024

(87) PCT Pub. No.: WO2023/046248
PCT Pub. Date: Mar. 30, 2023

(65) Prior Publication Data
US 2024/0392759 A1    Nov. 28, 2024

(30) Foreign Application Priority Data
Sep. 24, 2021 (DE) .................... 10 2021 210 690.0

(51) Int. Cl.
*F03G 7/06* (2006.01)
*F03G 7/00* (2006.01)

(52) U.S. Cl.
CPC ......... *F03G 7/06143* (2021.08); *F03G 7/027* (2021.08)

(58) Field of Classification Search
CPC ............................ F03G 7/06143; F03G 7/027
See application file for complete search history.

(56) References Cited

U.S. PATENT DOCUMENTS 6,484,848 B2    11/2002   Yoshida
2004/0261411 A1    12/2004   MacGregor
(Continued)

FOREIGN PATENT DOCUMENTS

DE          60031687 T2      9/2007
DE       102016225519 A1     6/2018
(Continued)

OTHER PUBLICATIONS

Mechanical Systems and Signal Processing (Year: 2017).*
(Continued)

*Primary Examiner* — Shafiq Mian

(57) ABSTRACT

Disclosed is detecting the position of an actuator element of an actuator arrangement, having at least one actuator element movable in two opposing directions by two adjustment elements. The adjustment elements electrically connected via only one two-wire connection to a control unit comprise electrically controllable shape memory alloy wires. A resistance measurement circuit formed in the control unit periodically records the resistance values of the two adjustment elements. At an energization time of a currently actuated adjustment element, the resistance value of the adjustment element and, in a subsequent pause in energization, the resistance value of another adjustment element is determined and stored. The differential value of the two resistance values is compared with pairs of values which are stored in a table and describe a correlation between the resistance differential value and a position of the adjustment element, to determine the position of the actuator element.

16 Claims, 6 Drawing Sheets

(56) References Cited

U.S. PATENT DOCUMENTS

| | | | | |
|---|---|---|---|---|
| 2012/0126157 | A1* | 5/2012 | Beck | H02N 2/062 251/129.05 |
| 2016/0209670 | A1* | 7/2016 | Brown | G03B 3/10 |
| 2020/0378516 | A1 | 12/2020 | Beuschel et al. | |
| 2020/0387516 | A1* | 12/2020 | Osotio | G06F 16/24575 |
| 2023/0304479 | A1* | 9/2023 | Beuschel | H02N 10/00 |

FOREIGN PATENT DOCUMENTS

| | | |
|---|---|---|
| DE | 102016219346 B4 | 3/2019 |
| DE | 202020103116 U1 | 6/2021 |
| DE | 102020210212 B3 | 2/2022 |
| WO | 2010136342 A1 | 12/2010 |
| WO | 2017098249 A1 | 6/2017 |
| WO | 2020115260 A1 | 6/2020 |

OTHER PUBLICATIONS

Josephine Selvarani Ruth D et al. "Shape memory alloy wire for self-sensing servo actuation", Elsevier, Amsterdam, NL, Bd. 83, Seiten 36-52, XP029721716, DOI: 10.1016/J.YMSSP.2016.05.042, Zusammenfassung; Abbildungen 1b, 9a-9d.

Jian-Jun Zhang et al. "Electrical Resistivity-Based Study of Self-Sensing Properties for Shape Memory Alloy-Actuated Artificial Muscle", Sensors, 2013, pp. 12958-12974, doi: 10.3390/s131012958, ISSN 1424-8220, MDPI.

Office Action dated May 9, 2022 from corresponding German patent application No. 10 2021 210 690.0.

International Search Report and Written Opinion dated Nov. 23, 2022 from corresponding International patent application No. PCT/DE2022/200200.

* cited by examiner

METHOD FOR DETECTING THE POSITION OF AN ACTUATOR ELEMENT

The invention relates to a method for detecting the position of an actuator element of an actuator arrangement, having at least one actuator element movable in two opposing directions by means of two adjustment elements, the adjustment elements being formed with electrically controllable shape memory alloy wires, and having a control unit which is electrically connected to the adjustment elements.

Such an actuator arrangement is already described in the (not pre-published) application 10 2020 210 212.0.

The actuator arrangement there is designed as a linear drive arrangement and has a rod movable through openings in bearing elements, which extends through an opening in a lever element which can be tilted in opposing directions with respect to the rod by adjustment elements made of electrically controllable shape memory alloy wires and, as a result, forms a frictional fit with the rod, as a result of which the rod is carried along with the lever element during a displacement of the latter. This results in a linear movement of the rod, which thus represents an actuator element. However, 10 2020 210 212.0 does not reveal how the two adjustment elements are to be controlled in a simple manner.

Actuators based on shape memory alloys (SMA for shape memory alloy) are compact and can be produced cost-effectively. In many cases, a plurality of such actuators are integrated directly in an electronic controller, e.g. for pneumatic valves.

For other applications, such as, for example, air control devices in a vehicle, a plurality of actuators is likewise needed. Here, however, the integration of the actuators in a controller is ruled out because of the function and arrangement of the adjustment elements to be actuated therewith. Instead, the actuators are installed "on site" on the respective adjustment element (e.g. pivotable flap). However, the control is to continue to be carried out via a common controller for cost reasons. Therefore, electrical lines are led from this controller to each individual actuator, which means that a corresponding outlay for cables and connectors arises.

Furthermore, such actuators often need a possible adjustment in two directions and a possible proportional adjustment, in order to be able to specifically control not only two end positions but also intermediate positions. Here, one possible way of detecting the position is enabled by monitoring or feedback control. Usually, end position switches, Hall sensors or potentiometers are used to detect the position, for which additional lines are needed.

DE 600 31 687 T2 describes cascaded SMA actuators and a resistance measurement of the SMA wire in PWM control pauses.

In DE 10 2016 219 346 B4 and DE 10 2016 225 519 A1, the control of an SMA actuator which is partly short-circuited in one end position is described, in order thus to detect the reaching of the end position by means of a voltage or current measurement via the control line.

WO 2010 136342 A1 discloses the control of an actuator comprising two oppositely acting piezoelectric crystals, the respectively non-controlled piezoelectric crystal being used as a sensor.

The object of the invention is to specify a method in which, despite fewer lines, the actuator is to be adjustable continuously in both directions and detection of the position is possible.

The object is achieved by a method for detecting the position of an actuator element of an actuator arrangement, having at least one actuator element movable in two opposing directions by means of two adjustment elements, the adjustment elements being formed with electrically controllable shape memory alloy wires, having a control unit electrically connected to the adjustment elements, the control unit having a controllable control circuit which is designed to connect one or the other adjustment element as required to a voltage source in a pulse width-modulated manner, wherein only one two-wire connection is formed between the control unit and the adjustment elements, having a resistance measurement circuit, which is formed in the control unit and periodically records the resistance values of the two adjustment elements, wherein at an energization time of a currently actuated adjustment element, the resistance value of this adjustment element and, in a subsequent pause in energization, the resistance value of the respective other adjustment element is determined and stored, wherein the differential value of the two determined resistance values is formed and compared with pairs of values which are stored in a table and describe a correlation between the resistance differential value and a position of an adjustment element, and the position of the actuator element is determined therefrom.

It is therefore possible, with little outlay on cabling, to connect both adjustment elements to a voltage source by means of the control unit and therefore to enable not only activation but also state detection, in particular position detection, via a resistance measurement.

The actuator element of the actuator arrangement can in particular be designed as a rocker, to the end regions of which a respective one of the adjustment elements is connected.

In this way, the actuator element can be pivoted about a pivot point in order to move an actuating means, such as for example a lamp. This can be carried out in a simple way in both directions because of the two adjustment elements.

However, any other embodiment of an actuator, for example as a linear actuator, is also possible.

In a preferred embodiment, the controllable control circuit of the actuator arrangement is designed as a full-bridge circuit formed with electronic switches. In this way, a polarity of the supply voltage can be reversed in a way which is known in principle.

In a preferred refinement of the method, the measurement of the resistance of the adjustment element actuated at the measurement time is carried out with the same resistance measurement circuit as the measurement of the resistance of the respective other adjustment element.

In a particularly preferred refinement of the method, each of the adjustment elements is connected to the control circuit via a diode, the diodes being installed with different polarizations and thermally coupled, so that their resistance values virtually cancel each other out during the formation of the difference.

In a development, a current measurement circuit of the resistance measurement circuit can be formed with at least one switchable current measurement resistance path, so that different current measurement resistances can be set, in order to determine the resistance characteristics of feed lines and the diodes from the resistance values thus determined.

In a preferred embodiment, the actuator arrangement has a resistance measurement circuit formed in the control unit, which is set up to periodically detect the resistance values of the two adjustment elements.

In this way, on the basis of a correlation of the resistances with the position of the adjustment elements and therefore the actuator element, an accurate position determination is possible.

Advantageously, the resistance measurement of an adjustment element is carried out during a control pause with a current intensity and a time period during which the adjustment element is not activated or its temperature is not noticeably increased.

For a calibration of the actuator arrangement, the current measurement circuit of the resistance measurement circuit can be formed with at least one switchable current measurement resistance path, so that different current measurement resistances can be set.

In an advantageous development, the adjustment elements can each be assigned an end position detection circuit, with which the end position of the adjustment elements can be detected, and the resistance ratio measured immediately before reaching the end position is assigned to an end position and stored appropriately in the table.

In this way, not only can overloading of the adjustment elements by a high current flow be avoided, since the current flow can be interrupted during the detection of the end position, but also a calibration can be carried out if the end position can be assigned as a unique position to a determined resistance value.

In one embodiment, the end position detection circuit can be set up to produce and to detect a short circuit of a respective controlled shape memory alloy wire when the end position of an adjustment element is reached.

In another embodiment, the end position detection circuit can be set up to interrupt the current flow through a respective controlled shape memory alloy wire when the end position of an adjustment element is reached, and to detect the interruption.

For the case in which an actuator arrangement has at least two actuator elements which are not actuated simultaneously, the full-bridge circuits controlling the associated adjustment elements can each be assigned a common half-bridge circuit. In this way, components can be saved.

In a development, even if there is a plurality of actuator elements and therefore a plurality of full-bridge circuits, the current measurement circuit can be arranged in series with the parallel-connected half-bridge circuits.

The invention is to be described in more detail below with reference to exemplary embodiments with the aid of figures, in which.

Figure 3:
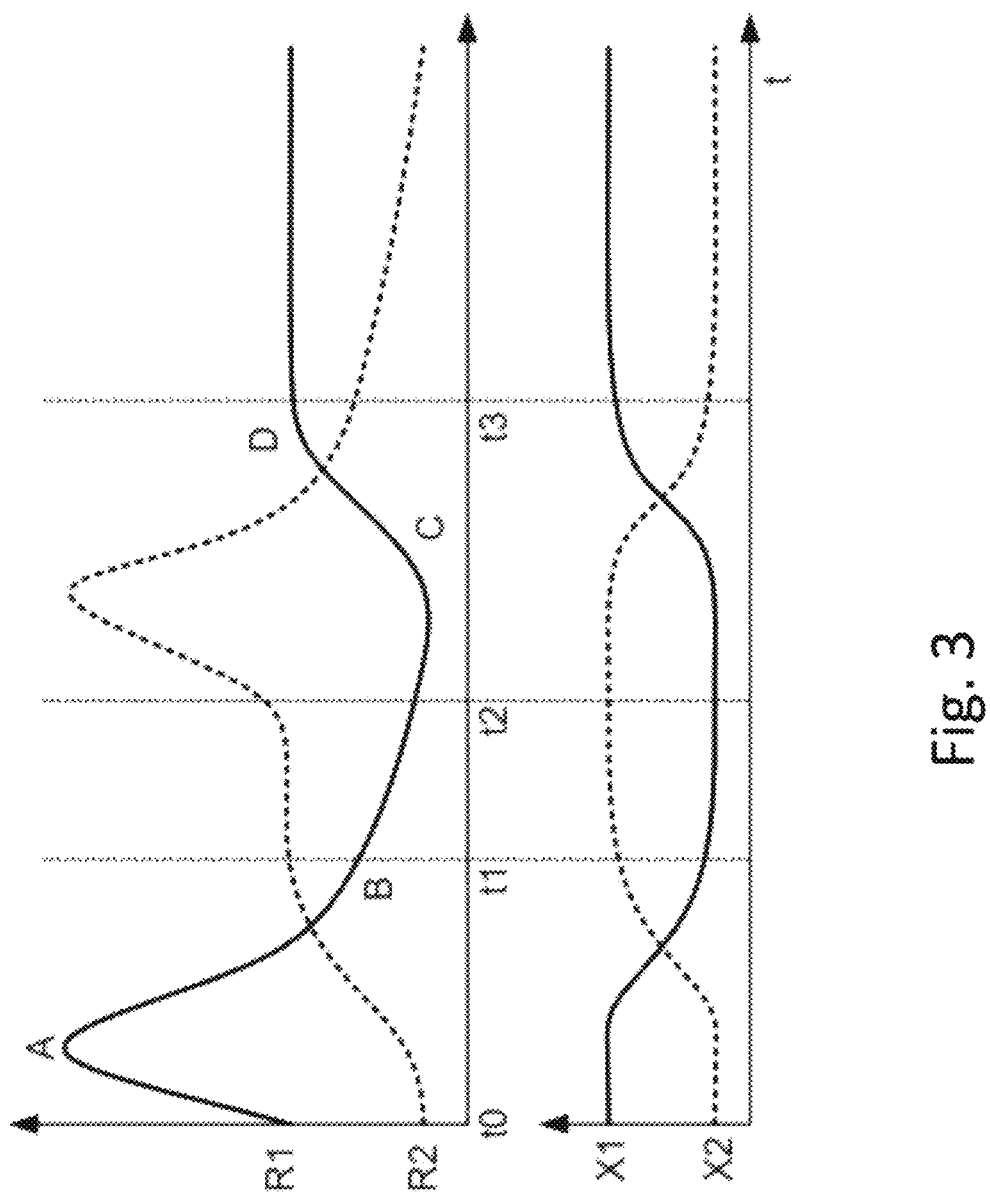
Figure 4:
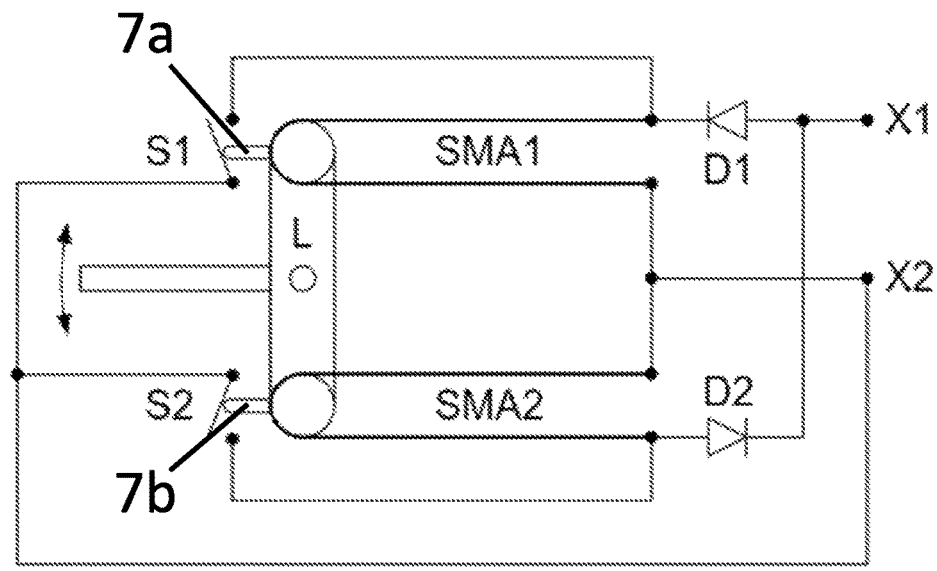
Figure 5:
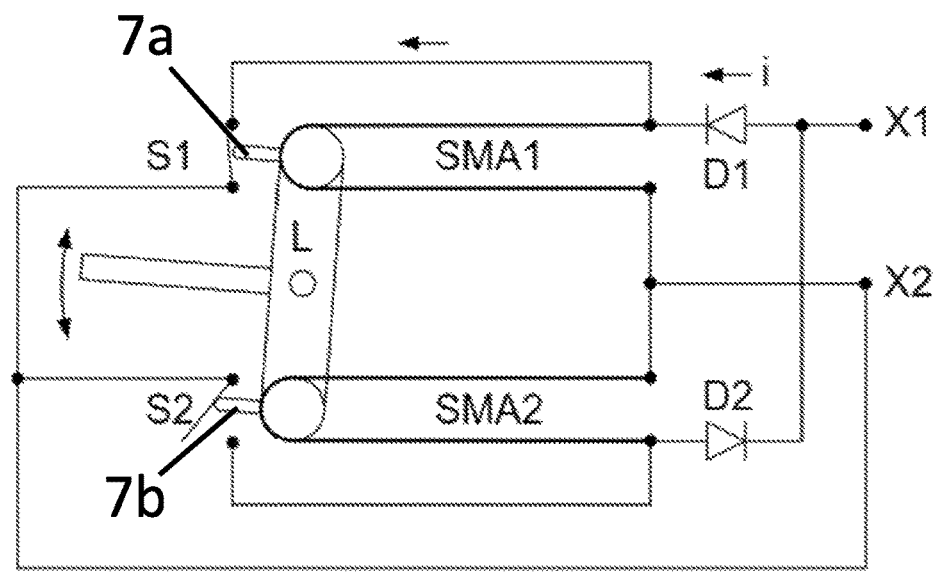
Figure 6:
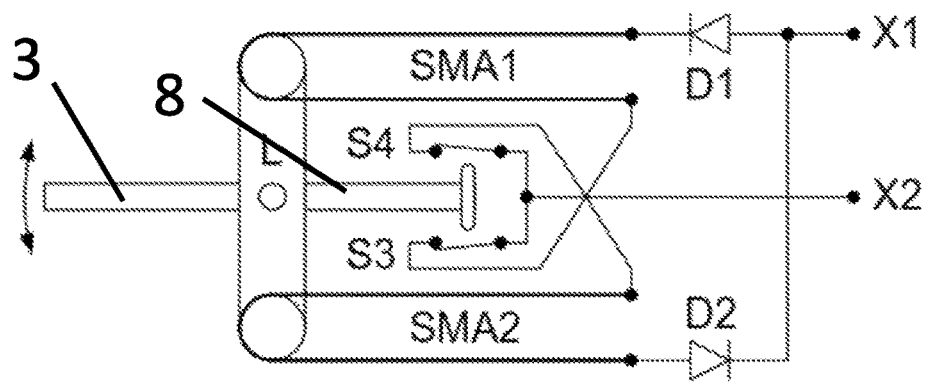
Figure 7:
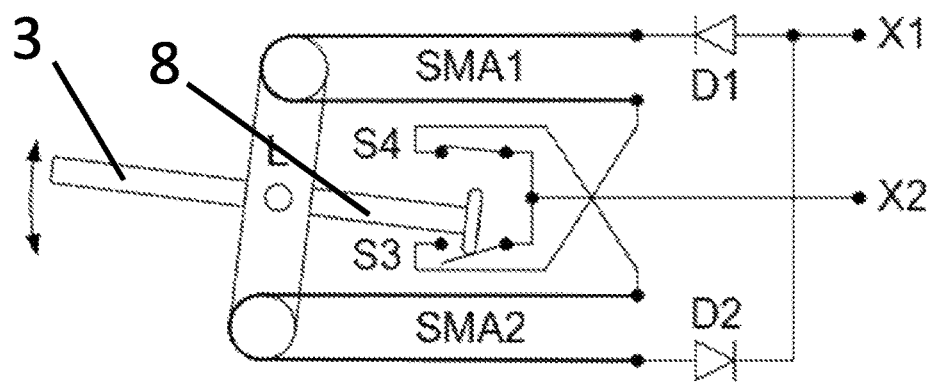
Figure 8:
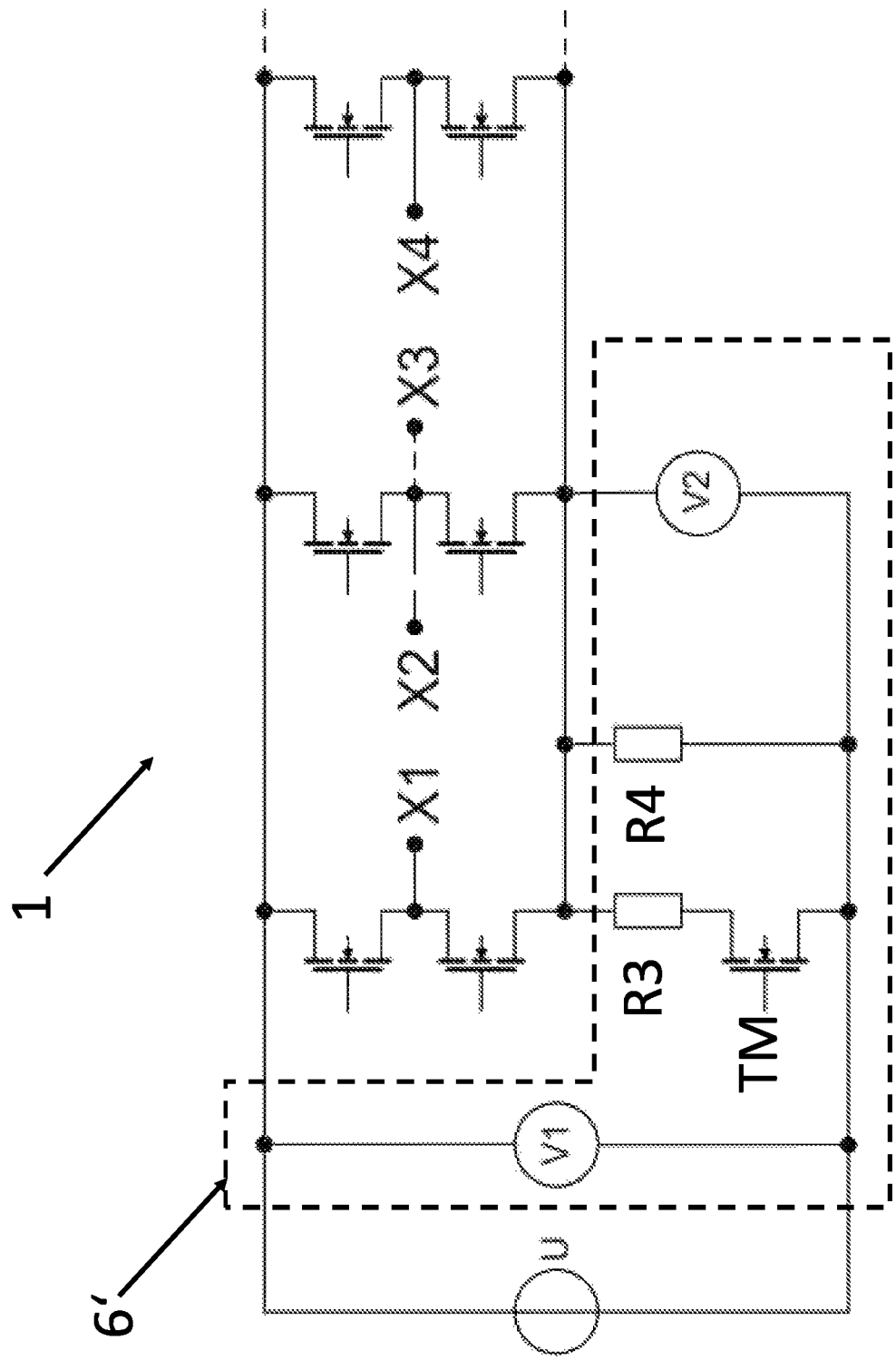

FIG. 3 shows resistance and length curves over time in controlled adjustment element pairs coupled mechanically via an actuator element, FIG. 4 shows an actuator element having two adjustment elements with a first variant of end position detection in the rest position, FIG. 5 shows an actuator element having two adjustment elements with a first variant of end position detection in the actuated end position, FIG. 6 shows an actuator element having two adjustment elements with a second variant of end position detection in the rest position, FIG. 7 shows an actuator element having two adjustment elements with a second variant of end position detection in the actuated end position, and FIG. 8 shows a control unit having an extended resistance measurement device for controlling an actuator element.

Figure 1:
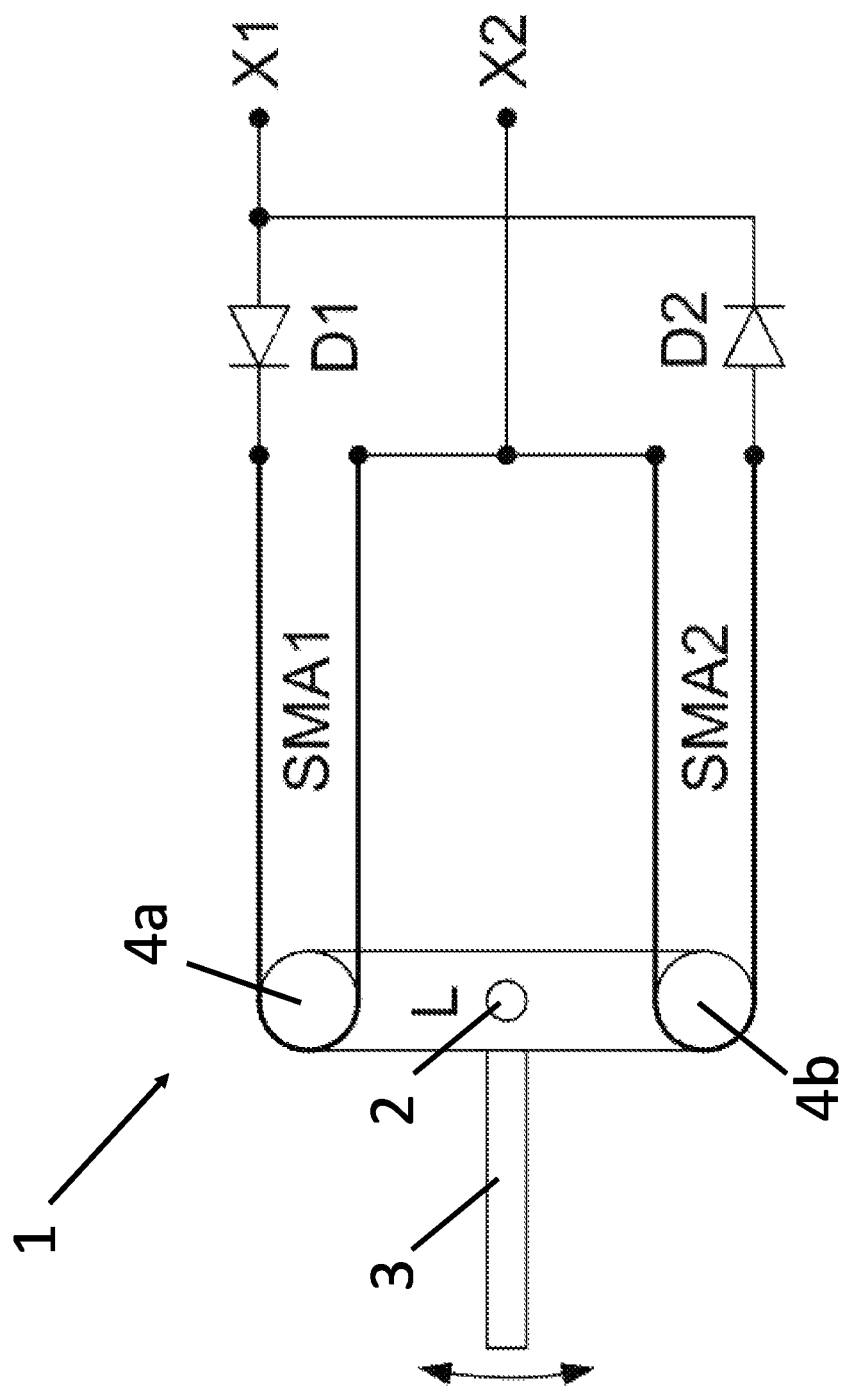
FIG. 1 shows an actuator element having two adjustment elements.

FIG. 1 shows an actuator 1, which is formed with an actuator element L which is designed as an elongated plate, which is rotatably mounted about a pivot point 2. In the region of the pivot point 2, an extension 3 is arranged approximately perpendicular to the longitudinal direction of the actuator element L and forms an actuating element. Therefore, if the actuator element L is rotated, then the extension 3 moves in accordance with the double arrow indicated and can thus actuate actuators, such as headlights or rear-view mirrors. In a first end region 4*a* and a second end region 4*b* of the actuator element L, nipples on which adjustment elements can engage are attached.

Thus, a first adjustment element SMA1 is designed as a shape memory alloy wire and wrapped around the nipple in the first end region 4*a*. The two ends of the wire are fixed, for example by means of two crimp elements, as is known in the prior art. In the same way, a second adjustment element SMA2 made of shape memory alloy wire is wrapped around the nipple in the second end region 4*b* of the actuator element L and, in the same way, is fastened by its two ends.

Now if, for example, the first adjustment element SMA1 is heated then, in the illustrated exemplary embodiment of FIG. 1, it shortens and pulls the first end region 4*a* to the right, so that the actuator element L rotates in the clockwise direction about the pivot point 2. As a result, the second adjustment element SMA2 is lengthened on account of its fixing between the fastened ends and the central part wrapped around the nipple in the second end region 4*b* of the actuator element L. In the same way, as a result of heating of the second adjustment element SMA2, the latter can be shortened, as a result of which the actuator element L rotates in the counter-clockwise direction about the pivot point 2 and again lengthens the first adjustment element SMA1.

In order to effect heating of the adjustment elements SMA1 and SMA2, a current is caused to flow through them, which leads to the corresponding heating. For this purpose, in each case one end of the shape memory alloy wires is connected to each other and to a second connection point X2, while the respective other ends of the shape memory alloy wires are energized by a first diode D1 for the first adjustment element SMA1 and a second diode D2 for the second adjustment element SMA2, the anode of the first diode D1 and the cathode of the second diode D2 being connected to a first connection X1 for this purpose.

As a result of this advantageous wiring of the adjustment elements SMA1, SMA2, because of the polarization of the diodes D1, D2, the first adjustment element SMA1 can be controlled by means of a positive voltage between the first connection X1 and the second connection X2, and the second adjustment element SMA2 can be controlled by means of a negative voltage between these two connection points X1, X2.

It is therefore possible, by using only two connections X1, X2, to actuate the two adjustment elements SMA1, SMA2 as required, by the polarity of the applied voltage being set accordingly.

Figure 2:
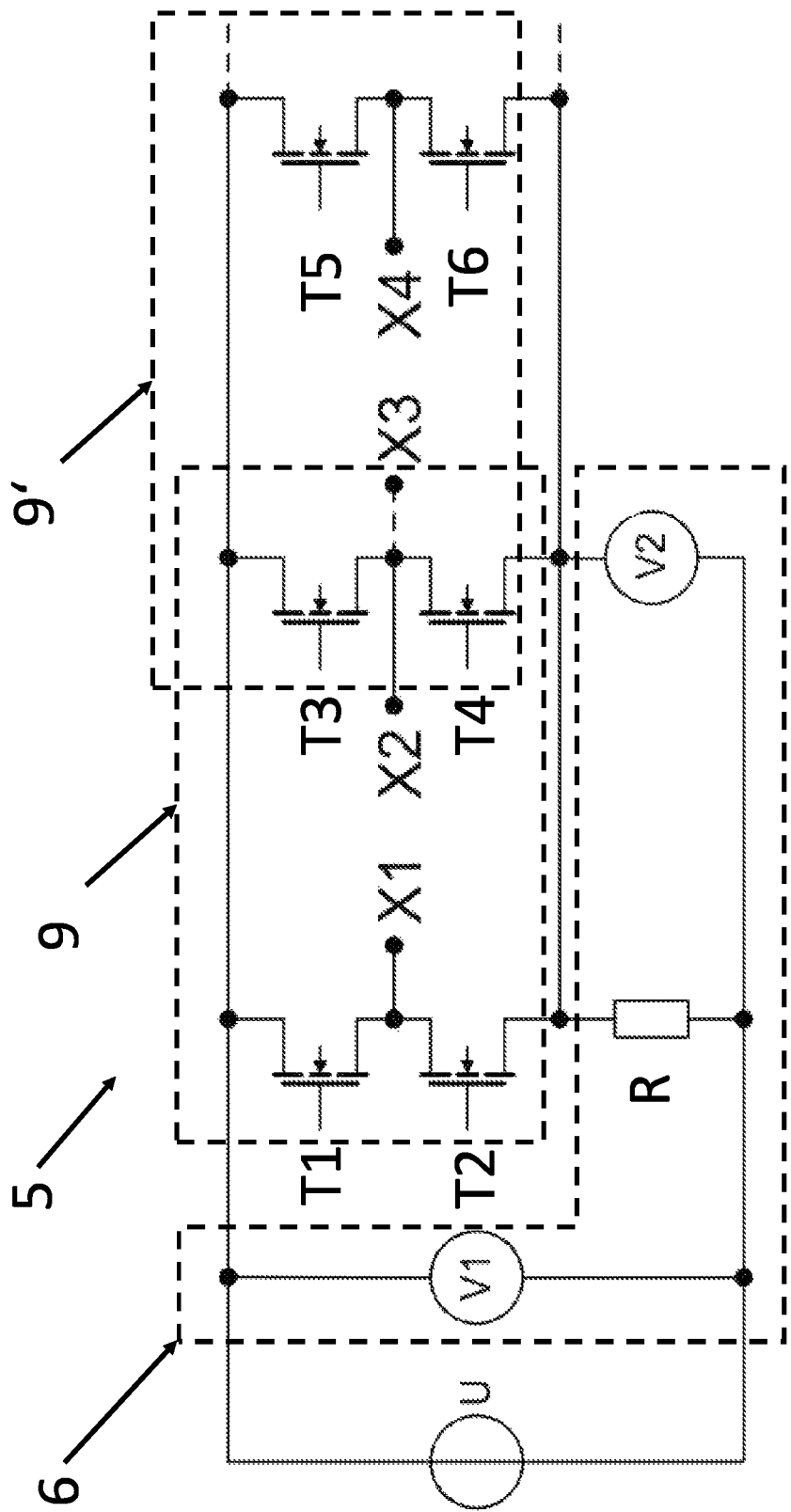
FIG. 2 shows a control unit for controlling an actuator element.

A simple circuit with which the polarity of a voltage can be rotated with only one voltage source U is shown by FIG. 2. Illustrated there is a control unit 5 which has a control circuit 9, which is built up as a full bridge made of four electronic switches, the electronic switches being formed with N-channel MOSFETs T1 to T4 in the exemplary embodiment illustrated. In a known manner, here a first transistor T1 and a second transistor T2 connected in series therewith form a first half bridge, which is wired in parallel with a second half bridge, which is formed with a third transistor T3 and a fourth transistor T4 which are connected in series. The respective connection points of the first transistor T1 and the second transistor T2 and, respectively, the third transistor T3 and the fourth transistor T4 form a first connection point X1 and a second connection point X2, respectively.

The two half bridges are connected in parallel with each other and a measuring resistor R is connected in series therewith, this series circuit being wired in parallel with a voltage source U. If, then, the first connection point X1 and the second connection point X2 are connected to the corresponding connections of the actuator 1, the voltage source U can energize the adjustment element SMA1 or the adjustment element SMA2 via the respective diode D1 or D2 by means of the simple control of two respective transistors of the control circuit 9.

If, for example, the first transistor T1 and the fourth transistor T4 are switched on, then there is a positive voltage between the connections X1 and X2, so that the first adjustment element SMA1 is energized. In the same way, by controlling the third transistor T3 and the second transistor T2, the second adjustment element SMA2 can be energized because of the now conductive second diode D2.

The current through the respective transistors T1, T4 and T2, T3 and the respective adjustment elements SMA1 or SMA2 also flows in the same way through the resistor R, which is wired in series with the full bridge and which is a constituent part of a resistance measurement circuit 6, which additionally has a first voltage measuring device V1, which is connected in parallel with the voltage source U, and a second voltage measuring device V2, which is connected in parallel with the resistor R. In this way, the voltage present on the respective adjustment element SMA1 or SMA2 and the current flowing through the adjustment element can be determined and the resistance of an adjustment element can be calculated therefrom.

If a plurality of actuators 1 is used, as illustrated in FIG. 1, it would be necessary also to use a plurality of control circuits 9. If the plurality of actuators 1 do not have to be actuated simultaneously, it would advantageously be possible to use a respective half bridge also in a further control circuit 9'. This is illustrated in FIG. 2, where the half bridge which is formed with the third transistor T3 and the fourth transistor T4 is likewise connected in parallel with a third half bridge, which is formed from a fifth transistor T5 and a sixth transistor T6, so that for a third connection X3 and a fourth connection X4 for a further actuator, these transistors T3 to T6 are wired in an alternative full bridge.

FIG. 3 shows the (highly enlarged) course over time of the first resistance R1 of the first adjustment element SMA1 and of the second resistance R2 of the second adjustment element SMA2, as illustrated schematically in FIG. 1. The two adjustment elements are coupled mechanically in opposite directions and are alternately energized. The lengths X1, X2 of these adjustment elements SMA1, SMA2 are likewise illustrated as a function overtime in the lower diagram of FIG. 3.

The first adjustment element SMA1 is activated in the time between the times t0 and t1, the second adjustment element SMA2 in the time between the times t2 and t3. The respective other adjustment element remains non-energized (apart from a possible resistance measurement).

The resistance R1 of the first adjustment element SMA1 initially rises when energized, because of the heating. Once it has reached the phase transition temperature (point A), the adjustment element SMA1 begins to shorten, as a result of which its resistance R1 decreases. At the time t1 (or point B), the transition has been completed. The shortening is substantially maintained even after the current has been switched off. During the subsequent cooling, the resistance R1 decreases still further (until t2).

If, then, starting from the time t2, the second adjustment element SMA2 is activated, its shortening leads to lengthening of the first adjustment element SMA1 (starting at point C) as a result of the mechanical coupling. At the same time, its resistance R2 increases as a result of the lengthening (as far as point D).

During the phases of the contraction or lengthening of the adjustment elements SMA1, SMA2, the electrical resistances R1, R2 of the two adjustment elements SMA1, SMA2 exhibit an opposed behavior, which is correlated with the length of the respective adjustment element SMA1, SMA2. By means of a measurement of the resistances R1, R2, the current position of the actuator can be determined (including intermediate positions for continuous positioning). This can be done, for example, by means of comparison with a table in which previously determined pairs of values for the resistance and the associated position have been entered.

Since the resistance change to be measured is comparatively low (typically <5%), a high measurement accuracy is needed. In particular, the influence of the diodes D1, D2, the voltage drop of which increases with temperature, is to be compensated. This is achieved by the following measures:

The difference of the electrical resistances R1, R2 of the two adjustment elements SMA1, SMA2 is considered, in particular from point A to B and from point C to D. As a result, the sensitivity of the measurement is increased considerably (approximately doubled).

Preferably, two identical diodes D1, D2 from the same batch are used for the two adjustment elements SMA1, SMA2, and these are thermally coupled (e.g. installed in the same housing). Therefore, the two diodes D1, D2 have approximately the same characteristics, which are eliminated by forming the difference.

The currents are measured via the same measuring device (current measuring resistor and AD converter). Thus, measurement errors (such as tolerance, temperature drift, non-linearity) are also largely eliminated when forming the difference.

The current intensity for activating an adjustment element SMA1, SMA2 and for the resistance measurement of the other adjustment element SMA1, SMA2 should be selected to be equally high as far as possible (with a correspondingly short energization period for the resistance measurement of the inactive adjustment element SMA1, SMA2). As a result, the two diodes D1, D2 produce virtually the same voltage drop. This is ensured by the circuit in FIG. 2.

With the aforementioned measures, the voltage drop through the cable connection to the adjustment element and through other electrical resistances (e.g. connectors) is also eliminated.

It is advantageous if, in adjustment elements which are based on shape memory alloy wires, an end position can be detected in order then to switch off or at least to reduce the current, in order to avoid overheating of the wire. In addition, as a result of the detection of the end position, a calibration of the resistance measurement device can be carried out in order to compensate for aging or temperature variations.

FIG. 4 shows a first variant of such an end position determination circuit which, in a configuration of the actuator as is already known from FIG. 1, has a first actuating element 7a in the first end region 4a and a second actuating element 7b in the second end region 4b of the actuator element L. These respectively actuate a first switching element S1 and a second switching element S2. The first switching element S1 is electrically connected in parallel with the first adjustment element SMA1, and the second switching element S2 in parallel with the second adjustment element SMA2, so that when a respective switching element S1 or S2 is closed, the respective associated adjustment element SMA1 or SMA2 is short-circuited and therefore its resistance changes, and therefore the end position can be detected during the measurement of the resistance.

Such an end position is illustrated in FIG. 5, where the first adjustment element SMA1 has shortened to such an extent that the first actuating element 7a has moved so far to the right that the first switching element S1 is now closed. As a result, the current flows substantially via the first switching element S1 and no longer via the first adjustment element SMA1, so that the resistance changes highly, which can readily be detected by the resistance measurement circuit 6.

FIGS. 6 and 7 show a further variant of an end position detection circuit, wherein here the current supply is interrupted by opening switching elements S3 and S4 as a result of a movement of an adjustment element SMA1, SMA2. In the exemplary embodiment illustrated in FIGS. 6 and 7, a third actuating element 8 which can actuate switching elements S3, S4 when the actuator element L is tilted is arranged at the pivot point 2 of the actuator element L. A third switching element S3 is wired between the second connection X2 and that connection of the shape memory alloy wire of the first adjustment element SMA1 which is not connected to the first diode D1, and a fourth switching element S4 is wired between the second connection X2 and that connection of the shape memory alloy wire of the second adjustment element SMA2 which is not connected to the second diode D2.

FIG. 7 now illustrates how the actuator element L moves the third actuating element 8 on account of the energization of the first adjustment element SMA1 and its shortening, and the third switching element S3 opens in order to interrupt the current flow through the first adjustment element SMA1, which in turn can be detected by the resistance measurement circuit 6, since the resistance of the adjustment element SMA1 changes as a result.

FIG. 8 shows a modified resistance measurement circuit 6' which is contained in the control circuit. Since the control circuit otherwise coincides with the control circuit of FIG. 2, further designations have been omitted. The changed resistance measurement circuit 6' here has two parallel-connected resistors R3 and R4, a measuring transistor TM being wired in series with the third resistor R3. By controlling this transistor TM, the third resistor R3 can be connected in parallel with the fourth resistor R4 or inactivated, as a result of which the current measurement resistance which is formed by the third and the fourth resistor R4 can be changed. In this way, the resistance characteristics of the feed line can be determined, for example as a linear equation, or else the voltage drop across the diodes D1, D2. The latter allows the actual temperature of the diodes D1, D2 to be inferred in the event that no thermally coupled diodes can be used.

The present invention can be used to control a wide range of electrical actuators, such as for example to position optical elements, ventilation flaps or retractable operating elements.

The advantages of the invention are:

An actuator can be adjusted continuously in two directions via a minimum number of electrical lines and, at the same time, its position can be detected.

By means of forming a difference between the measured resistances of the two adjustment elements, the effect of an unknown variable influence on the feed line and diodes (for example as a result of heating) can be factored out.

A plurality of such adjustment elements can be controlled with a reduced outlay on hardware, if they are energized at offset times.

The invention claimed is:

1. A method for detecting a position of an actuator element of an actuator arrangement, comprising
   at least one actuator element movable in two opposing directions by two adjustment elements, wherein the adjustment elements are formed with electrically controllable shape memory alloy wires, and
   a control unit electrically connected to the adjustment elements,
   wherein the control unit has a controllable control circuit which is configured to connect one or the other adjustment element as required to a voltage source in a pulse width-modulated manner, and
   wherein only one two-wire connection is formed between the control unit and the adjustment elements, the method comprising:
   periodically recording by a resistance measurement circuit formed in the control unit the resistance values of the two adjustment elements,
   at an energization time of a currently actuated adjustment element, determining and storing the resistance value of the adjustment element and, in a subsequent pause in energization, the resistance value of a respective other adjustment element,
   forming and comparing a differential value of the two determined resistance values with pairs of values which are stored in a table and describe a correlation between the resistance differential value and a position of an adjustment element, and determining the position of the actuator element therefrom.

2. The method as claimed in claim 1, wherein the measurement of the resistance of the adjustment element actuated at measurement time is carried out with the same resistance measurement circuit as the measurement of the resistance of the respective other adjustment element.

3. The method as claimed in claim 1, wherein each of the adjustment elements is connected to the control circuit via a diode, wherein diodes are installed with different polarizations and thermally coupled, so that their resistance values virtually cancel each other out during the formation of the differential value.

4. The method as claimed in one of claim 1, wherein a current measurement circuit of the resistance measurement circuit is formed with at least one switchable current measurement resistance path, so that different current measurement resistances can be set, to determine resistance characteristics of feed lines from the resistance values thus determined.

5. The method as claimed in claim 1, wherein an end position of the adjustment elements is detected and a resistance ratio measured immediately before reaching the end position is assigned to an end position and stored appropriately in the table.

6. The method as claimed in claim 2, wherein each of the adjustment elements is connected to the control circuit via a diode, wherein diodes are installed with different polarizations and thermally coupled, so that their resistance values virtually cancel each other out during the formation of the differential value.

7. The method as claimed in one of claim 6, wherein a current measurement circuit of the resistance measurement circuit is formed with at least one switchable current measurement resistance path, so that different current measurement resistances can be set, to determine resistance characteristics of feed lines and the diodes from the resistance values thus determined.

8. The method as claimed in claim 7, wherein an end position of the adjustment elements is detected and a resistance ratio measured immediately before reaching the end position is assigned to an end position and stored appropriately in the table.

9. The method as claimed in claim 6, wherein an end position of the adjustment elements is detected and a resistance ratio measured immediately before reaching the end position is assigned to an end position and stored appropriately in the table.

10. The method as claimed in one of claim 2, wherein a current measurement circuit of the resistance measurement circuit is formed with at least one switchable current measurement resistance path, so that different current measurement resistances can be set, to determine resistance characteristics of feed lines from the resistance values thus determined.

11. The method as claimed in claim 10, wherein an end position of the adjustment elements is detected and a resistance ratio measured immediately before reaching the end position is assigned to an end position and stored appropriately in the table.

12. The method as claimed in claim 2, wherein an end position of the adjustment elements is detected and a resistance ratio measured immediately before reaching the end position is assigned to an end position and stored appropriately in the table.

13. The method as claimed in one of claim 3, wherein a current measurement circuit of the resistance measurement circuit is formed with at least one switchable current measurement resistance path, so that different current measurement resistances can be set, to determine resistance characteristics of feed lines and the diodes from the resistance values thus determined.

14. The method as claimed in claim 13, wherein an end position of the adjustment elements is detected and a resistance ratio measured immediately before reaching the end position is assigned to an end position and stored appropriately in the table.

15. The method as claimed in claim 3, wherein an end position of the adjustment elements is detected and a resistance ratio measured immediately before reaching the end position is assigned to an end position and stored appropriately in the table.

16. The method as claimed in claim 4, wherein an end position of the adjustment elements is detected and a resistance ratio measured immediately before reaching the end position is assigned to an end position and stored appropriately in the table.

* * * * *